(12) United States Patent
Terada et al.

(10) Patent No.: US 7,029,181 B2
(45) Date of Patent: Apr. 18, 2006

(54) ROLLING BEARING AND FAN MOTOR USING THE SAME

(75) Inventors: Yasuhisa Terada, Kanagawa (JP); Kenji Takei, Kanagawa (JP); Michiharu Naka, Kanagawa (JP)

(73) Assignee: NSK Ltd., Tokyo (JP)

( * ) Notice: Subject to any disclaimer, the term of this patent is extended or adjusted under 35 U.S.C. 154(b) by 175 days.

(21) Appl. No.: 10/792,217

(22) Filed: Mar. 4, 2004

(65) Prior Publication Data

US 2005/0196086 A1    Sep. 8, 2005

(51) Int. Cl.
*F16C 33/66*    (2006.01)
*F16C 33/38*    (2006.01)

(52) U.S. Cl. .................. 384/470; 384/462; 384/523
(58) Field of Classification Search ............. 384/462, 384/470, 450, 523, 531
See application file for complete search history.

(56) References Cited

U.S. PATENT DOCUMENTS

| | | | | |
|---|---|---|---|---|
| 4,493,513 A * | 1/1985 | Osawa et al. | ............... | 384/533 |
| 5,401,105 A * | 3/1995 | Suzuki et al. | ............... | 384/470 |
| 5,522,667 A * | 6/1996 | Miyake | ...................... | 384/492 |
| 5,642,945 A * | 7/1997 | Abe | .......................... | 384/470 |
| 6,340,244 B1 * | 1/2002 | Fujita et al. | ................ | 384/462 |
| 6,648,517 B1 * | 11/2003 | Ishiwada et al. | ........... | 384/531 |

* cited by examiner

*Primary Examiner*—Thomas R. Hannon
(74) *Attorney, Agent, or Firm*—Sughrue Mion, PLLC

(57) ABSTRACT

A rolling bearing lubricated with a grease includes an outer ring, an inner ring, a plurality of rolling elements disposed between respective rolling raceway tracks of the outer ring and the inner ring, and a retainer having a plurality of pockets for locking the rolling elements to freely roll and formed of resin material. In the rolling bearing, the radial clearance gap ratio of the pockets of the retainer is set to $0 \leq \delta r/Da \leq 0.09$, and the axial clearance gap ratio of the pockets is set to $0 \leq \delta a/Da \leq 0.06$ when the kinematic viscosity of base oil at 40° C. of the grease is 10 to 40 $mm^2/sec$, being set to $0 \leq \delta a/Da \leq 0.05$ when the kinematic viscosity of base oil is 10 to 90 $mm^2/sec$, being set to $0 \leq \delta a/Da \leq 0.025$ when the kinematic viscosity of base oil is 10 to 160 $mm^2/sec$.

20 Claims, 1 Drawing Sheet

AXIAL CLEARANCE GAP RATIO $\delta a/Da$

ROLLING BEARING AND FAN MOTOR USING THE SAME

BACKGROUND OF THE INVENTION

1. Field of the Invention

The present invention relates to a rolling bearing lubricated with grease and particularly to the rolling bearing for use in a fan motor.

2. Description of the Related Art

A rolling bearing having a retainer made of resin has been mostly used in a motor having a fan on a shaft (hereinafter referred to as fan motor) for use in household electrical appliances such as a vacuum cleaner, a washing machine and a KOTATSU (Japanese foot warmer with frame and coverlet), air conditioning products such as air conditioners for houses and automobiles, a hot-air heater, an air cleaner, and a smoke separator, a hot-water supply device, a personal computer and measuring devices.

In the rolling bearing used in the fan motor, generally an axial clearance gap ratio $\delta a/Da$ of a diameter $Da$ of a ball as a rolling element to an axial clearance gap $\delta a$ provided between a pocket face of a pocket of a retainer and a rolling face of the rolling element is set to about 0.08, a radial clearance gap ratio $\delta r/Da$ of the diameter $Da$ of the ball to a radial clearance gap $\delta r$ provided between the pocket face of the retainer and the rolling face of the rolling element is set to about 0.1. As a lubricating material, used is a grease obtained by adding a lithium soap base or diurea base thickener to a base oil.

However, in the case where the above-mentioned related-art rolling bearing is used in a low temperature environment, a base oil kinematic viscosity of grease becomes higher so that the base oil having the high kinematic viscosity irregularly flows in the clearance gap between the rolling element and the pocket, resulting in easily generating a collision noise (hereinafter referred to as retainer noise) due to collision of the rolling element and the retainer. Especially in the case of use in a very low temperature environment as much as −30° C., such a tendency becomes further strong.

Further, when a grease contains a large quantity of thickener for making the base oil of grease semi-solid, the grease is liable to be solidified at a low temperature so that the fluidity is lowered to further easily generate the retainer noise.

On the other hand, among the fan motors, as to the rolling bearing used in the fan motor especially used in an air-conditioning product such as an air conditioner, even if the retainer noise in a low temperature environment is a little, there has been the demand toward the reduction of noise. Further, there has been a strong demand toward energy-saving of electric appliances, and the rolling bearing has been expected to be decreased in a driving torque.

SUMMARY OF THE INVENTION

A first object of the present invention is to provide a rolling bearing, which may reduce a retainer noise even in a low-temperature environment by clarifying a relationship between a clearance gap between a pocket of a retainer and a rolling element, a base oil kinematic viscosity of grease, and the retainer noise.

A second object of the present invention is to provide a rolling bearing, which may reduce a retainer noise even in a low-temperature environment by clarifying a relationship between a clearance gap between a pocket of a retainer and a rolling element, a pour point of grease, and the retainer noise.

A third object of the present invention is to provide a rolling bearing, which may reduce a retainer noise even in a low temperature environment by clarifying a relationship between a clearance gap between a pocket of a retainer and a rolling element, a quantity of a thickener of grease and the retainer noise.

In order to accomplish the objects above, the following means are adopted. According to a first aspect of the present invention, there is provided a rolling bearing, which is lubricated with a grease and includes an outer ring having a rolling raceway track on its inner peripheral surface, an inner ring having a rolling raceway track on its outer peripheral surface, a plurality of rolling elements disposed between the respective raceway tracks of the outer ring and the inner ring, and a retainer having a plurality of pockets for locking the rolling elements to freely roll and formed of resin material, wherein when a diameter of the rolling element is taken as $Da$, a radial clearance gap between a pocket face of the pocket and a rolling face of the rolling element is taken as $\delta r$, and an axial clearance gap between the pocket face of the pocket and the rolling face of the rolling element is taken as $\delta a$, in the case where a kinematic viscosity of base oil at 40° C. of the grease is 10 to 40 mm$^2$/sec, at least one of the pockets of the retainer is shaped so that the radial clearance gap ratio $\delta r/Da$ is $0 \leq \delta r/Da \leq 0.09$, and the axial clearance gap ratio $\delta a/Da$ is $0 \leq \delta a/Da \leq 0.06$.

Further, when the kinematic viscosity of base oil at 40° C. of grease is 10 to 90 mm$^2$/sec, at least one of the pockets of the retainer is shaped so that the radial clearance gap ratio $\delta r/Da$ is $0 \leq \delta r/Da \leq 0.09$, and the axial clearance gap ratio $\delta a/Da$ is set to $0 \leq \delta a/Da \leq 0.05$. Further, when the kinematic viscosity of base oil at 40° C. of the grease is 10 to 160 mm$^2$/sec, at least one of the pockets of the retainer is shaped so that the radial clearance gap ratio $\delta r/Da$ is $0 \leq \delta r/Da \leq 0.09$, and the axial clearance gap ratio $\delta a/Da$ is $0 \leq \delta a/Da \leq 0.025$.

According to a second aspect of the present invention, there is provided a rolling bearing, which is lubricated with a grease, and includes an outer ring having a rolling raceway track on its inner peripheral surface, an inner ring having a rolling raceway track on its outer peripheral surface, a plurality of rolling elements disposed between the respective raceway tracks of the outer ring and the inner ring, and a retainer having a plurality of pockets for locking the rolling elements to freely roll and formed of resin material, wherein when a diameter of the rolling element is taken as $Da$, a radial clearance gap between a pocket face of the pocket and a rolling face of the rolling element is taken as $\delta r$, and an axial clearance gap between the pocket face of the pocket and the rolling face of the rolling element is taken as $\delta a$, in the case where the grease including a base oil of a pour point of −30° C. or lower is used, at least one of the pockets of the retainer is shaped so that the radial clearance gap ratio $\delta r/Da$ is $0 \leq \delta r/Da \leq 0.09$, and the axial clearance gap ratio $\delta a/Da$ is $0 \leq \delta a/Da \leq 0.06$.

According to a third aspect of the present invention, there is provided a rolling bearing, which is lubricated with a grease, and includes an outer ring having a rolling raceway track on its inner peripheral surface, an inner ring having a rolling raceway track on its outer peripheral surface, a plurality of rolling elements disposed between the respective raceway tracks of the outer ring and the inner ring, and a retainer having a plurality of pockets for locking the rolling elements to freely roll and formed of resin material wherein when a diameter of the rolling element is taken as Da, a radial clearance gap between a pocket face of the pocket and a rolling face of the rolling element is taken as δr, and an axial clearance gap between the pocket face of the pocket and the rolling face of the rolling element is taken as δa, in the case where the grease containing 20 mass % or less thickener is used, at least one of the pockets of the retainer is shaped so that the radial clearance gap ratio δr/Da is $0 \leq \delta r/Da \leq 0.09$, and the axial clearance gap ratio δa/Da is $0 \leq \delta a/Da \leq 0.06$.

DETAILED DESCRIPTION OF THE INVENTION

Figure 1:
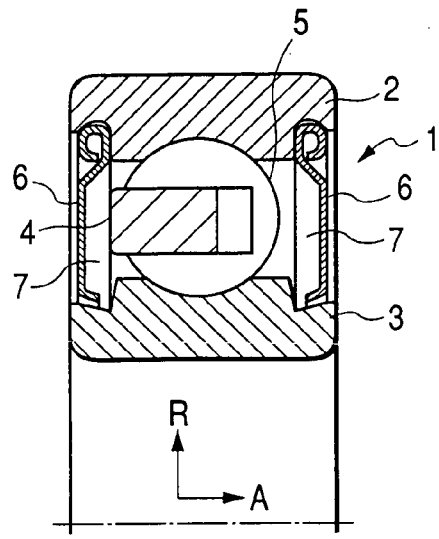
FIG. 1 is a half section view showing a rolling bearing according to an embodiment of the present invention.
Figure 2:
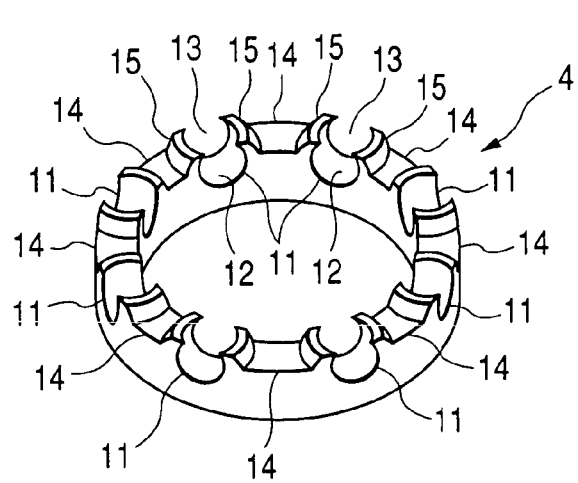
FIG. 2 is a perspective view showing a retainer of the present invention.

An embodiment of a rolling bearing according to the present invention will now be described with reference to the attached drawings. FIG. 1 is a half section view showing a rolling bearing according to an embodiment of the present invention, and FIG. 2 is a perspective view showing a retainer of the present invention.

In FIG. 1, a rolling bearing 1 is lubricated with a grease. The rolling bearing 1 comprises an outer ring 2 having a rolling raceway track on its inner peripheral surface and an inner ring 3 having a rolling raceway track on its the outer peripheral surface. A retainer 4 is an annular member as shown in FIG. 2 formed by injection molding of resin material.

A plurality of balls 5 as a rolling element are locked at a determined pitch in the retainer 4 to prevent mutual contact, and disposed to freely roll between the raceway track provided on the outer ring 2 and the raceway track provided on the inner ring 3 opposite thereto. Sealing plates 6 as a sealing member are disposed on both sides of the ball 5, and are fitted to the inner peripheral surface of the outer ring 2, and adjacent to the outer peripheral surface of the inner ring 3. Therefore, it is possible to prevent entering of dust and muddy water from the outside and seal the grease as a lubricating material in a space 7 between the outer ring 2 and the inner ring 3.

An arrow A shown in FIG. 1 indicates an axial direction of the rolling bearing 1, and an arrow R indicates a radial direction of the rolling bearing 1. In FIG. 2, a plurality of pockets 11 are provided at a determined pitch in a circumferential direction of the retainer 4. A pocket face 12 is formed spherical, whereby the ball 5 is locked to freely roll.

An opening part 13 is provided on one side in the axial direction of the pocket 11 and has an opening a little smaller than a diameter Da of the ball 5. The opening part 13 functions as an inlet for inserting the ball 5 in the pocket 11, and after the ball 5 is inserted, it exhibits a function of a stopper for preventing dropping of the ball 5 out of the pocket 11. A retainer bar 14 is provided between the adjacent pockets 11 to function as a barrier rib for preventing the mutual contact of the balls 5.

Nail parts 15 are provided on both sides of the opening part 13 and formed substantially like a circular arc so that the elasticity of the resin material is easily used for inserting the ball 5 in the pocket 11. The operation of the above-mentioned structure will be described. In the present embodiment, an inner peripheral surface of the inner ring 3 is fitted to a shaft not shown and interlocked to rotate. The outer ring 2 is fixed to a housing or the like not shown.

When the shaft is rotated, the balls 5 locked in the retainer 4 and disposed between the raceway tracks of the outer ring 2 and the inner ring 3 are respectively lubricated with grease to roll on the rolling raceway tracks, and the shaft is supported to freely rotate by the fixed outer ring 2. At the time, the grease sealed in the space 7 between the outer ring 2 and the inner ring 3 by the sealing plate 6 enters a clearance gap formed between the ball 5 inserted in the pocket 11 of the retainer 4 and the pocket face 12, thereby lubricating the rolling surface of the ball 5 and the pocket face 12 by its lubricating action so that the shaft is smoothly rotated.

In a low temperature environment, a base oil kinematic viscosity of the grease becomes higher so that the grease irregularly flows in the clearance gap between the pocket face 12 of the pocket 11 of the retainer 4 and the rolling surface of the ball 5, resulting in causing a phenomenon that the ball 5 collides with the retainer 4 to excite vibration of the retainer 4 to generate a noise of the retainer. In a very low temperature environment, such a tendency becomes further strong. Or, when a grease contains a large quantity of thickener, such a tendency in the low temperature environment becomes further strong. Accordingly, in order to reduce the vibration of the retainer and reduce the noise of the retainer, it is considered effective to reduce an axial clearance gap δa and a radial clearance gap δr. However, inflow of a lubricant to a narrow clearance gap is hindered by the rise of the base oil kinematic viscosity of the grease in a very low temperature environment, so there is the fear that lubrication failure occurs. Consequently, there is the fear of increase in the driving torque, abrasion of the pocket of the retainer, and early increase of the retainer noise due to the occurrence of poor lubrication. When the grease containing a large quantity of thickener is used in the low temperature environment, inflow of a lubricant to the narrow clearance gap is hindered by the rise of kinematic viscosity of the grease, so there is also the fear that increase in the driving torque, abrasion of the pocket of the retainer and early increase in the retainer noise are caused by lubrication failure.

In view of the above-mentioned matter, we have made a test for examining the influence of the kinematic viscosity of the base oil of the grease, the axial clearance gap δa and radial clearance gap δr between the rolling surface of the ball 5 and the pocket face 12 upon the noise of the retainer of the rolling bearing 1, and a test for examining the influence of the axial clearance gap δa upon the driving torque of the rolling bearing 1. The axial clearance gap δa and the radial clearance gap δr are respectively diameter clearance gaps (each of which is obtained by subtracting the diameter of the ball 5 from the diameter of the pocket 11 in the axial or radial direction), and in order to generalize the test results, as the ratio to the diameter Da of the ball 5, the axial clearance gap ratio δa/Da and the radial clearance gap ratio δr/Da are used to be dimensionless parameters and coordinated.

The test used a rolling bearing having the radial clearance gap ratio of $0 \leq \delta r/Da \leq 0.09$ and a bearing number 608 (outside diameter of Φ22 mm, an inside diameter of Φ8 mm) determined by the ISO, in which an outer ring 2 is a static ring and an inner ring 3 is a rotating ring. Under the test conditions, that is, the atmosphere temperature of 0° C. and the rotating speed of 1800 rpm, the test has been made and the noise of the retainer at the time has been evaluated. In the evaluation on the noise of the retainer, the kinematic viscosity of the base oil of the grease at 40° C. is divided into three groups of 10 to 40, 40 to 90, and 90 to 160 mm$^2$/sec, and the five rolling bearings for each level of axial clearance gap of the ball 5 in the pocket 11 have been evaluated on the noise of the retainer, and the determination has been made as in the following. "○" indicates that no retainer noise is generated; "Δ" indicates that small retainer noise is generated; and "X" indicates that large retainer noise is generated.

The evaluation results of the thus tested retainer noise are shown in Table 1.

TABLE 1

Determination of Retainer Noise

| Kinematic viscosity* | Axial Clearance Gap Ratio δa/Da | | | | | | | |
|---|---|---|---|---|---|---|---|---|
| | 0.001 | 0.01 | 0.025 | 0.04 | 0.05 | 0.06 | 0.07 | 0.08 |
| 10 to 40 mm$^2$/sec | ○ | ○ | ○ | ○ | ○ | ○ | ○ | X |
| | ○ | ○ | ○ | ○ | ○ | ○ | Δ | X |
| | ○ | ○ | ○ | ○ | ○ | ○ | ○ | Δ |
| | ○ | ○ | ○ | ○ | ○ | ○ | Δ | Δ |
| | ○ | ○ | ○ | ○ | ○ | ○ | Δ | Δ |
| 40 to 90 mm$^2$/sec | ○ | ○ | ○ | ○ | ○ | ○ | X | X |
| | ○ | ○ | ○ | ○ | ○ | ○ | ○ | Δ |
| | ○ | ○ | ○ | ○ | ○ | Δ | Δ | Δ |
| | ○ | ○ | ○ | ○ | ○ | Δ | X | Δ |
| | ○ | ○ | ○ | ○ | ○ | ○ | ○ | X |
| 90 to 160 mm$^2$/sec | ○ | ○ | ○ | ○ | ○ | X | X | X |
| | ○ | ○ | ○ | Δ | X | Δ | X | X |
| | ○ | ○ | ○ | ○ | Δ | Δ | X | X |
| | ○ | ○ | ○ | Δ | Δ | X | X | X |
| | ○ | ○ | ○ | ○ | ○ | X | Δ | X |

*: Kinematic viscosity of Base Oil of Grease at 40° C.
○: none
Δ: small
X: large As shown in Table 1, it is found that each base oil kinematic viscosity of the grease has a no retainer noise region. That is, according to the determination result of retainer noise, when the kinematic viscosity of base oil of the grease at 40° C. ranges from 10 to 40 mm$^2$/sec, the region of the axial clearance gap ratio δa/Da=0.06 or less is a no retainer noise region, when the kinematic viscosity of base oil of the grease at 40° C. ranges from 10 to 90 mm$^2$/sec, the region of the axial clearance gap ratio δa/Da=0.05 or less is a no retainer noise region, and when the kinematic viscosity of base oil of the grease at 40° C. ranges from 10 to 160 mm$^2$/sec, the region of the axial clearance gap ratio δa/Da=0.025 or less is a no retainer noise region.

It is also found that as to the grease used in the rolling bearing 1, the magnitude of retainer noise is univocally determined according to the base oil kinematic viscosity regardless of the type of grease such as lithium soap base grease. The base oil of the grease is not limited to a single kind, but two or more kinds of base oil may be mixed with each other or two or more kinds of base oil may get mixed in. When the kinematic viscosity of base oil of the compound grease exhibited after mixing or after mixing-in is used as the above kinematic viscosity of grease, the similar evaluation result can be obtained.

Figure 3:
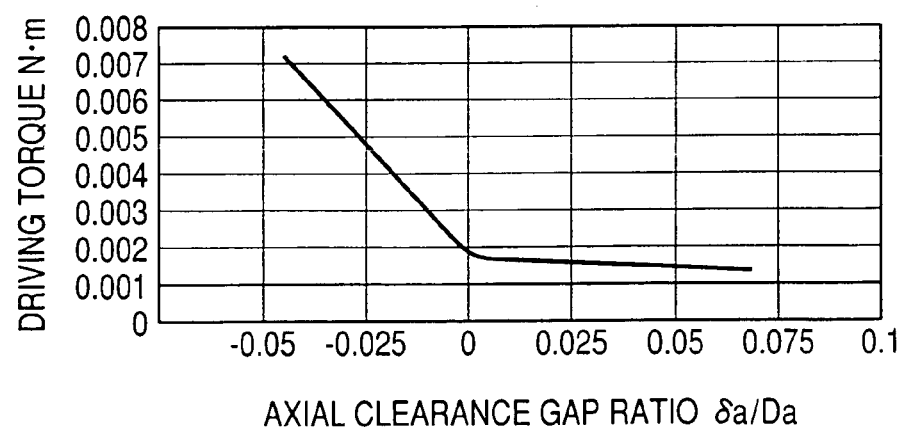
FIG. 3 is a graph showing a relationship between an axial clearance gap and a driving torque.

Subsequently, the relationship between the axial clearance gap ratio δa/Da and the driving torque of the rolling bearing 1 under the similar test conditions to the above has been obtained. The result is shown in FIG. 3. As shown in FIG. 3, it is found that when the axial clearance gap ratio δa/Da is equal to or smaller than 0, the driving torque of the rolling bearing 1 is suddenly increased, and when δa/Da is 0 or more, the driving torque is equal to that of the ordinary rolling bearing.

According to the present embodiments as described above, in the rolling bearing having the radial clearance gap ratio of 0≦δr/Da≦0.09, as to the axial clearance gap ratio 0≦δa/Da, when the kinematic viscosity of base oil of the grease at 40° C. ranges from 10 to 40 mm$^2$/sec, the axial clearance gap ratio is set in a region of 0≦δa/Da≦0.06, or when the kinematic viscosity of base oil ranges from 10 to 90 mm$^2$/sec, the axial clearance gap ratio is set in a region of 0≦δa/Da≦0.05.

When the kinematic viscosity of base oil ranges from 10 to 160 mm$^2$/sec, the axial clearance gap ratio is set in a region of 0≦δa/Da≦0.025. Thus, it is possible to obtain the rolling bearing, which will not generate the retainer noise without any increase in the driving torque even in a low temperature environment. As described above, the rolling bearing, which will not generate the retainer noise, can be obtained by reducing the clearance gap between the pocket 11 of the retainer 4 of the rolling bearing and the ball 5.

Next, we have made a test for examining the influence of a pour point of base oil of the grease, and the axial clearance gap δa and radial clearance gap δr between the rolling surface of the ball 5 and the pocket face 12 upon the noise of the retainer of the rolling bearing 1 in a very low temperature. The axial clearance gap δa and the radial clearance gap δr are respectively diameter clearance gaps, and in order to generalize the test results, as the ratio to the diameter Da of the ball 5, the axial clearance gap ratio δa/Da and the radial clearance gap ratio δr/Da are used to be dimensionless parameters and coordinated.

The test used a rolling bearing having the radial clearance gap ratio of 0≦δr/Da≦0.09 and the axial clearance gap ratio of 0≦δa/Da≦0.06 and a bearing number 608 (outside diameter of Φ22 mm, an inside diameter of Φ8 mm) determined by the ISO, in which an outer ring 2 is a static ring, and an inner ring 3 is a rotating ring. Under the test conditions, that is, the atmosphere temperature of −30° C. and 20° C. and the rotating speed of 1800 rpm, the test has been made and the noise of the retainer at the time has been evaluated. In the evaluation on the noise of the retainer, the grease having various base oil pour points and the kinematic viscosities at 40° C. was used to evaluate on the noise of the retainer of the rolling bearing, and the determination has been made as in the following. "○" indicates that no retainer noise is generated; and "X" indicates that large retainer noise is generated. The evaluation result of the retainer noise depending on the difference in pour point of the base oil is shown in Table 2.

TABLE 2

Determination of Retainer Noise

| Base Oil | Dioctyl sebacate | Polyalpha olefin | Pentaerythritol ester | silicone | Naphthene mineral oil | Diphenyl ether | paraffin mineral oil |
|---|---|---|---|---|---|---|---|
| Pour point (° C.) | −60 | −54 | −50 | −50 | −30 | −15 | −15 |
| Kinematic viscosity of Base oil (mm$^2$/s, 40° C.) | 11.3 | 48 | 33 | 80 | 130 | 270 | 100 |
| Retainer noise determination (20° C.) | ○ | ○ | ○ | ○ | ○ | ○ | ○ |
| Retainer noise determination (−30° C.) | ○ | ○ | ○ | ○ | ○ | X | X |

○: none
X: large

As shown in Table 2, it is found that in the case where the atmospheric temperature is 20° C., with any grease, retainer noise is not generated so that excellent rotary motion can be performed, but in the case where the atmospheric temperature is −30° C., retainer noise is not generated to perform excellent rotary motion only when the pour point of the base oil of grease is −30° C. or lower.

In order to verify the above findings, we have made a test for examining the influence of a combination of radial clearance gap ratio δr/Da and axial clearance gap ratio δa/Da upon the retainer noise. In testing, grease whose base oil has a pour point of −30° C. and whose kinematic viscosity at 40° C. is 160 mm$^2$/sec was used, and the atmospheric temperature was set to −30° C. to determine and evaluate the retainer noise similarly to the above. The result is shown in Table 3.

In this case, it is apparent that at the radial clearance gap ratio of δr/Da=0.1, the retainer noise is large in the region of axial clearance gap ratio δa/Da=0.037 or less, so a test has been omitted for heightening the efficiency.

TABLE 3

Determination of Retainer Noise

| δr/Da | δa/Da | | | | | |
|---|---|---|---|---|---|---|
| | 0.001 | 0.013 | 0.037 | 0.06 | 0.078 | 0.09 |
| 0.05 | ○ | ○ | ○ | ○ | X | X |
| 0.07 | ○ | ○ | ○ | ○ | X | X |
| 0.09 | ○ | ○ | ○ | ○ | X | X |
| 0.1 | — | — | — | X | X | X |

○: none
X: large
—: omitted

As shown in Table 3, the result is that the retainer noise is not generated in the region of the radial clearance gap ratio of 0≦δr/Da≦0.09 and the axial clearance gap ratio of 0≦δa/Da≦0.06 so that excellent rotary motion can be performed.

According to the present embodiment, as described above, even in a very low temperature environment as much as −30° C., the grease whose base oil has a pour point of −30° C. or lower is used, and a rolling bearing having a radial clearance gap of 0≦δr/Da≦0.09 and an axial clearance gap ratio of 0≦δa/Da≦0.06 is used to thereby obtain the rolling bearing which will not generate the retainer noise as the determination result of retainer noise.

As described above, when the grease whose base oil has a pour point of −30° C. or lower is used, it is possible to obtain the rolling bearing which will not generate the retainer noise by setting the axial clearance gap and the radial clearance gap between the pocket 11 of the retainer 4 and the ball 5 of the rolling bearing smaller under fixed conditions. The base oil of the grease, however, has the kinematic viscosity as another property, so even with the same pour point of base oil, the grease is different in kinematic viscosity.

In view of the above-mentioned matter, we have made a test for examining the influence of the kinematic viscosity of the base oil of the grease, the axial clearance gap δa and radial clearance gap δr between the rolling surface of the ball 5 and the pocket face 12 upon the noise of the retainer of the rolling bearing 1, and a test for examining the influence of the axial clearance gap δa upon the driving torque of the rolling bearing 1 under the similar conditions to those used for obtaining the results in Table 1. The evaluation result showed the same result as that in Table 1.

That is, as shown in Table 1, according to the determination result of retainer noise, when the kinematic viscosity of base oil of the grease at 40° C. ranges from 10 to 40 mm$^2$/sec, the region of the axial clearance gap ratio δa/Da=0.06 or less is a no retainer noise region, when the kinematic viscosity of base oil of the grease at 40° C. ranges from 10 to 90 mm$^2$/sec, the region of the axial clearance gap ratio δa/Da=0.05 or less is a no retainer noise region, and when the kinematic viscosity of base oil of the grease at 40° C. ranges from 10 to 160 mm$^2$/sec, the region of the axial clearance gap ratio δa/Da=0.025 or less is a no retainer noise region.

Further, as shown in FIG. 3, it is found that when the axial clearance gap ratio δa/Da is equal to or smaller than 0, the driving torque of the rolling bearing 1 is suddenly increased, and when δa/Da is 0 or more, the driving torque is equal to that of the ordinary rolling bearing.

From the above-mentioned results, it will be apparent that in the rolling bearing using the grease whose base oil has a pour point of −30° C. or lower and having the radial clearance gap ratio of 0≦δr/Da≦0.09, as to the axial clearance gap ratio 0≦δa/Da, when the kinematic viscosity of base oil of the grease at 40° C. ranges from 10 to 40 mm$^2$/sec, the axial clearance gap ratio is set in a region of 0≦δa/Da≦0.06, or when the kinematic viscosity of base oil ranges from 10 to 90 mm²/sec, the axial clearance gap ratio is set in a region of $0 \leq \delta a/Da \leq 0.05$.

When the kinematic viscosity of base oil ranges from 10 to 160 mm²/sec, the axial clearance gap ratio is set in a region of $0 \leq \delta a/Da \leq 0.025$. Thus, it is possible to obtain the rolling bearing, which will not generate the retainer noise in a very low temperature environment and will not generate retainer noise without any increase in the driving torque even in a very low temperature environment. As described above, the rolling bearing, which will not generate the retainer noise, can be obtained by reducing the clearance gap between the pocket 11 of the retainer 4 of the rolling bearing and the ball 5.

Next, we have made a test for examining the influence of the quantity of thickener in the grease, and the axial clearance gap $\delta a$ and radial clearance gap $\delta r$ between the rolling surface of the ball 5 and the pocket face 12 upon the noise of the retainer of the rolling bearing 1. The axial clearance gap $\delta a$ and the radial clearance gap $\delta r$ are respectively diameter clearance gaps, and in order to generalize the test results, as the ratio to the diameter Da of the ball 5, the axial clearance gap ratio $\delta a/Da$ and the radial clearance gap ratio $\delta r/Da$ are used to be dimensionless parameters and coordinated.

The test uses a rolling bearing having the radial clearance gap ratio of $0 \leq \delta r/Da \leq 0.09$ and the axial clearance gap ratio of $0 \leq \delta a/Da \leq 0.06$ and a bearing number 608 (outside diameter of Φ22 mm, an inside diameter of Φ8 mm) determined by the ISO, in which an outer ring 2 is a static ring, and an inner ring 3 is a rotating ring. Under the test conditions, that is, the atmosphere temperature of 0° C. and 20° C. and the rotating speed of 1800 rpm, the test has been made and the noise of the retainer at the time has been evaluated.

In the evaluation on the noise of the retainer, the grease having various base oil pour point and the kinematic viscosities at 40° C. was used to evaluate on the noise of the retainer of the rolling bearing, and the determination has been made as in the following. "○" indicates that no retainer noise is generated; "Δ" indicates that small retainer noise is generated; and "X" indicates that large retainer noise is generated. The evaluation result of the retainer noise depending on the difference in quantity of the thickener is shown in Table 4.

As shown in Table 4, it is found that when the atmospheric temperature is 20° C., in the case where the quantity of thickener is 25 mass % or less in every kind of grease, the retainer noise is not generated to perform excellent rotary motion, but when the atmospheric temperature is 0° C., only in the case where the quantity of thickener in every kind of grease is 20 mass % or less, the retainer noise is not generated to perform excellent rotary motion.

It is also found that the magnitude of retainer noise of the rolling bearing 1 is univocally determined according to the quantity of thickener regardless of the type of grease such as lithium soap base grease. According to the present embodiment, as described above, even in a low temperature environment as much as 0° C., the grease containing 20 mass % or less thickener is used, and a rolling bearing having a radial clearance gap of $0 \leq \delta r/Da \leq 0.09$ and an axial clearance gap ratio of $0 \leq \delta a/Da \leq 0.06$ is used to thereby obtain the rolling bearing which will not generate the retainer noise as the determination result of retainer noise.

As described above, when the grease containing 20 mass % or less thickener is used, it is possible to obtain the rolling bearing which will not generate the retainer noise by setting the axial clearance gap and the radial clearance gap between the pocket 11 of the retainer 4 and the ball 5 of the rolling bearing smaller under fixed conditions. The grease, however, has kinematic viscosity as another property, however, so even with the same quantity of thickener, the grease is different in the kinematic viscosity.

In view of the above-mentioned matter, we have made a test for examining the influence of the kinematic viscosity of the base oil of the grease, the axial clearance gap $\delta a$ and radial clearance gap $\delta r$ between the rolling surface of the ball 5 and the pocket face 12 upon the noise of the retainer of the rolling bearing 1, and a test for examining the influence of the axial clearance gap $\delta a$ upon the driving torque of the rolling bearing 1 under the similar conditions to those used for obtaining the results in Table 1. The grease used in the test is grease containing 20 mass % or less thickener. The evaluation result showed the same result as that in Table 1.

That is, as shown in Table 1, according to the determination result of retainer noise, when the kinematic viscosity of base oil of the grease at 40° C. ranges from 10 to 40 mm²/sec, the region of the axial clearance gap ratio

TABLE 4

| | Determination of Retainer Noise | | | | | | | | | | |
|---|---|---|---|---|---|---|---|---|---|---|---|
| Thickener | Lithium soap | | | Lithium complex soap | | | Barium complex soap | | diurea | | | Sodium complex soap |
| Quantity mass % | 10 | 20 | 25 | 15 | 20 | 30 | 20 | 30 | 10 | 20 | 25 | 30 |
| Base oil kinematic viscosity (mm²/s, 40° C.) | | 115 | | | 31 | | 30.5 | | | 48 | | 110 |
| Retainer noise determination (20° C.) | ○ | ○ | ○ | ○ | ○ | Δ | ○ | X | ○ | ○ | ○ | X |
| Retainer noise determination (0° C.) | ○ | ○ | Δ | ○ | ○ | X | ○ | X | ○ | ○ | X | X |

○: none
Δ: small
X: large

δa/Da=0.06 or less is a no retainer noise region, when the kinematic viscosity of base oil of the grease at 40° C. ranges from 10 to 90 mm²/sec, the region of the axial clearance gap ratio δa/Da=0.05 or less is a no retainer noise region, and when the kinematic viscosity of base oil of the grease at 40° C. ranges from 10 to 160 mm²/sec, the region of the axial clearance gap ratio δa/Da=0.025 or less is a no retainer noise region.

Further, as shown in FIG. 3, it is found that when the axial clearance gap ratio δa/Da is equal to or smaller than 0, the driving torque of the rolling bearing 1 is suddenly increased, and when δa/Da is 0 or more, the driving torque is equal to that of the ordinary rolling bearing.

From the above-mentioned result, it will be apparent that in the rolling bearing using the grease containing 20 mass % or less thickener and having the radial clearance gap ratio of $0 \leq \delta r/Da \leq 0.09$, as to the axial clearance gap ratio $0 \leq \delta a/Da$, when the kinematic viscosity of base oil of the grease at 40° C. ranges from 10 to 40 mm²/sec, the axial clearance gap ratio is in a region of $0 \leq \delta a/Da \leq 0.06$, or when the kinematic viscosity of base oil ranges from 10 to 90 mm²/sec, the axial clearance gap ratio is in a region of $0 \leq \delta a/Da \leq 0.05$.

When the kinematic viscosity of base oil ranges from 10 to 160 mm²/sec, the axial clearance gap ratio is set in a region of $0 \leq \delta a/Da \leq 0.025$. Thus, it is possible to obtain the rolling bearing, which will not generate the retainer noise in a very low temperature environment and will not generate the retainer noise without any increase in the driving torque even in a low temperature environment. As described above, the rolling bearing, which will not generate the retainer noise, can be obtained by reducing the clearance gap between the pocket 11 of the retainer 4 of the rolling bearing and the ball 5.

In order to provide all of the pockets 11 with the shape (hereinafter referred to as the countermeasure pocket shape) of the pocket 11 having a very narrow clearance gap between the ball 5 and the pocket face 12 as described above, however, it is necessary to work the rolling bearing with good accuracy of the axial position and radial position of the pocket 11 and the shape of the pocket 11, and especially, in the resin-made retainer 4 formed of resin material, it is necessary to improve the accuracy of a metal mold used in forming. Since it is difficult to manufacture the metal mold, the manufacturer's labor for the metal mold is increased and the cost for its manufacture is increased.

In order to find the number of countermeasure pocket shapes required, we have made a test for evaluating the retainer noise reduction effect depending on the number of countermeasure pocket shapes. In testing, the countermeasure pocket shapes are scattered at substantially equal spaces in the circumferential direction in the conventional retainer 4 and similarly to the above, the retainer noise has been determined and evaluated under the same test conditions as the above. The evaluation result is shown in Table 5.

The pocket 11 of the retainer 4 used in the test was provided in seven areas.

TABLE 5

Determination of Retainer Noise

| | Number of Countermeasure Pocket Shapes | | | | | | |
|---|---|---|---|---|---|---|---|
| | 1 | 2 | 3 | 4 | 5 | 6 | 7 |
| Retainer Noise Determination | X | Δ | ○ | ○ | ○ | ○ | ○ |

○: none
Δ: small
X: large

As shown in Table 5, when the countermeasure pocket shapes are provided in at least three areas, it is possible to obtain the rolling bearing, which will not generate the retainer noise. Thus, when the countermeasure pocket shapes are disposed in at least three areas in the circumferential direction of the retainer, the rolling bearing, which will not generate the retainer noise, can be provided, and the manufacture of a metal mold for forming the resin-made retainer can be facilitated, so that the labor of the metal mold manufacturer can be reduced and the manufacturing cost of the metal mold can be lowered.

As described above, the rolling bearing of the present invention exhibits a remarkable effect especially in application to a fan motor expected to reduce the noise in low temperature environment.

According to the invention, as described above, it is possible to obtain the rolling bearing reduced in the retainer noise without any increase in the driving torque by setting the shape of the retainer of the rolling bearing depending on the relationship between the kinematic viscosity of base oil of grease, the axial clearance gap ratio δa/Da and the radial clearance gap ratio δr/Da.

Further, according to the invention, as described above, it is possible to obtain the rolling bearing reduced in the retainer noise without any increase in the driving torque by setting the shape of the retainer of the rolling bearing depending on the relationship between the pour point of base oil of grease, the axial clearance gap ratio δa/Da and the radial clearance gap ratio δr/Da.

Furthermore, according to the invention, as described above, it is possible to obtain the rolling bearing reduced in the retainer noise even in a low temperature environment by setting the shape of the retainer of the rolling bearing depending on the relationship between the quantity of thickener in grease, the axial clearance gap ratio δa/Da and the radial clearance gap ratio δr/Da.

What is claimed is:

1. A rolling bearing, which is lubricated with a grease, comprising:
    an outer ring having a rolling raceway track on its inner peripheral surface;
    an inner ring having a rolling raceway track on its outer peripheral surface;
    a plurality of rolling elements disposed between the respective raceway tracks of the outer ring and the inner ring; and
    a retainer having a plurality of pockets for locking the rolling elements to freely roll and formed of resin material,
    wherein when a diameter of the rolling element is taken as Da, a radial clearance gap between a pocket face of the pocket and a rolling face of the rolling element is taken as δr, and an axial clearance gap between the pocket face of the pocket and the rolling face of the rolling element is taken as δa, in the case where a kinematic viscosity of base oil at 40° C. of the grease is 10 to 40 mm²/sec, at least one of the pockets of the retainer is shaped so that the radial clearance gap ratio δr/Da is 0≦δr/Da≦0.09, and the axial clearance gap ratio δa/Da is 0≦δda/Da≦0.06.

2. The rolling bearing according to claim 1, wherein the pockets of the retainer, each of which is shaped so that the radial clearance gap ratio δr/Da is 0≦δr/Da≦0.09, and the axial clearance gap ratio δa/Da is 0≦δa/Da≦0.06, are disposed at substantially equal spaces in at least three places.

3. A rolling bearing, which is lubricated with a grease, comprising:
   an outer ring having a rolling raceway track on its inner peripheral surface;
   an inner ring having a rolling raceway track on its outer peripheral surface;
   a plurality of rolling elements disposed between the respective raceway tracks of the outer ring and the inner ring; and
   a retainer having a plurality of pockets for locking the rolling elements to freely roll and formed of resin material,
   wherein when a diameter of the rolling element is taken as Da, a radial clearance gap between a pocket face of the pocket and a rolling face of the rolling element is taken as δr, and an axial clearance gap between the pocket face of the pocket and the rolling face of the rolling element is taken as δa, in the case where a kinematic viscosity of base oil at 40° C. of the grease is 10 to 90 mm²/sec, at least one of the pockets of the retainer is shaped so that the radial clearance gap ratio δr/Da is 0≦δr/Da≦0.09, and the axial clearance gap ratio δa/Da is 0≦δa/Da≦0.05.

4. The rolling bearing according to claim 3, wherein the pockets of the retainer, each of which is shaped so that the radial clearance gap ratio δr/Da is 0≦δr/Da≦0.09, and the axial clearance gap ratio δa/Da is 0≦δa/Da≦0.05, are disposed at substantially equal spaces in at least three places.

5. A rolling bearing, which is lubricated with a grease, comprising:
   an outer ring having a rolling raceway track on its inner peripheral surface;
   an inner ring having a rolling raceway track on its outer peripheral surface;
   a plurality of rolling elements disposed between the respective raceway tracks of the outer ring and the inner ring; and
   a retainer having a plurality of pockets for locking the rolling elements to freely roll and formed of resin material,
   wherein when a diameter of the rolling element is taken as Da, a radial clearance gap between a pocket face of the pocket and a rolling face of the rolling element is taken as δr, and an axial clearance gap between the pocket face of the pocket and the rolling face of the rolling element is taken as δa, in the case where a kinematic viscosity of base oil at 40° C. of the grease is 10 to 160 mm²/sec, at least one of the pockets of the retainer is shaped so that the radial clearance gap ratio δr/Da is 0≦δr/Da≦0.09, and the axial clearance gap ratio δa/Da is 0≦δa/Da≦0.025.

6. The rolling bearing according to claim 5, wherein the pockets of the retainer, each of which is shaped so that the radial clearance gap ratio δr/Da is 0≦δr/Da≦0.09, and the axial clearance gap ratio δa/Da is 0≦δa/Da≦0.025, are disposed at-substantially equal spaces in at least three places.

7. A fan motor using a rolling bearing lubricated with a grease, the rolling bearing comprising: an outer ring having a rolling raceway track on its inner peripheral surface; an inner ring having a rolling raceway track on its outer peripheral surface; a plurality of rolling elements disposed between the respective raceway tracks of the outer ring and the inner ring; and a retainer having a plurality of pockets for locking the rolling elements to freely roll and formed of resin material, wherein when a diameter of the rolling element is taken as Da, a radial clearance gap between a pocket face of the pocket and a rolling face of the rolling element is taken as δr, and an axial clearance gap between the pocket face of the pocket and the rolling face of the rolling element is taken as δa, in the case where a kinematic viscosity of base oil at 40° C. of the grease is 10 to 40 mm²/sec, at least one of the pockets of the retainer is shaped so that the radial clearance gap ratio δr/Da is 0≦δr/Da≦0.09, and the axial clearance gap ratio δa/Da is 0≦δa/Da≦0.06.

8. The fan motor using a rolling bearing according to claim 7, wherein the pockets of the retainer, each of which is shaped so that the radial clearance gap ratio δr/Da is 0≦δr/Da≦0.09, and the axial clearance gap ratio δa/Da is 0≦a/Da≦0.06, are disposed at substantially equal spaces in at least three places.

9. A fan motor using a rolling bearing lubricated with a grease, the rolling bearing comprising: an outer ring having a rolling raceway track on its inner peripheral surface; an inner ring having a rolling raceway track on its outer peripheral surface; a plurality of rolling elements disposed between the respective raceway tracks of the outer ring and the inner ring; and a retainer having a plurality of pockets for locking the rolling elements to freely roll and formed of resin material, wherein when a diameter of the rolling element is taken as Da, a radial clearance gap between a pocket face of the pocket and a rolling face of the rolling element is taken as δr, and an axial clearance gap between the pocket face of the pocket and the rolling face of the rolling element is taken as δa, in the case where a kinematic viscosity of base oil at 40° C. of the grease is 10 to 90 mm²/sec, at least one of the pockets of the retainer is shaped so that the radial clearance gap ratio δr/Da is 0≦δr/Da≦0.09, and the axial clearance gap ratio δa/Da is 0≦δa/Da≦0.05.

10. The fan motor using a rolling bearing according to claim 9, wherein the pockets of the retainer, each of which is shaped so that the radial clearance gap ratio δr/Da is 0≦δr/Da≦0.09, and the axial clearance gap ratio δa/Da is 0≦δa/Da≦0.05, are disposed at substantially equal spaces in at least three places.

11. A fan motor, using a rolling bearing lubricated with a grease, the rolling bearing comprising: an outer ring having a rolling raceway track on its inner peripheral surface; an inner ring having a rolling raceway track on its outer peripheral surface; a plurality of rolling elements disposed between the respective raceway tracks of the outer ring and the inner ring; and a retainer having a plurality of pockets for locking the rolling elements to freely roll and formed of resin material, wherein when a diameter of the rolling element is taken as Da, a radial clearance gap between a pocket face of the pocket and a rolling face of the rolling element is taken as δr, and an axial clearance gap between the pocket face of the pocket and the rolling face of the rolling element is taken as δa, in the case where a kinematic viscosity of base oil at 40° C. of the grease is 10 to 160 mm²/sec, at least one of the pockets of the retainer is shaped so that the radial clearance gap ratio δr/Da is 0≦δr/Da≦0.09, and the axial clearance gap ratio δa/Da is 0≦δa/Da≦0.025.

12. The fan motor using a rolling bearing according to claim 11, wherein the pockets of the retainer, each of which is shaped so that the radial clearance gap ratio δr/Da is 0≦δr/Da≦0.09, and the axial clearance gap ratio δa/Da is 0≦δa/Da≦0.025, are disposed at substantially equal spaces in at least three places.

13. A rolling bearing, which is lubricated with a grease, comprising:
an outer ring having a rolling raceway track on its inner peripheral surface;
an inner ring having a rolling raceway track on its outer peripheral surface;
a plurality of rolling elements disposed between the respective raceway tracks of the outer ring and the inner ring; and
a retainer having a plurality of pockets for locking the rolling elements to freely roll and formed of resin material,
wherein when a diameter of the rolling element is taken as Da, a radial clearance gap between a pocket face of the pocket and a rolling face of the rolling element is taken as δr, and an axial clearance gap between the pocket face of the pocket and the rolling face of the rolling element is taken as δa, in the case where the grease including a base oil of a pour point of −30° C. or lower is used, at least one of the pockets of the retainer is shaped so that the radial clearance gap ratio δr/Da is 0≦δr/Da≦0.09, and the axial clearance gap ratio δa/Da is 0≦δa/Da≦0.06.

14. The rolling bearing according to claim 13, wherein the pockets of the retainer, each of which is shaped so that the radial clearance gap ratio δr/Da is 0≦δr/Da≦0.09, and the axial clearance gap ratio δa/Da is 0≦δa/Da≦0.06, are disposed at substantially equal spaces in at least three places.

15. A fan motor using a rolling bearing lubricated with a grease, the rolling bearing comprising: an outer ring having a rolling raceway track on its inner peripheral surface; an inner ring having a rolling raceway track on its outer peripheral surface; a plurality of rolling elements disposed between the respective raceway tracks of the outer ring and the inner ring; and a retainer having a plurality of pockets for locking the rolling elements to freely roll and formed of resin material, wherein when a diameter of the rolling element is taken as Da, a radial clearance gap between a pocket face of the pocket and a rolling face of the rolling element is taken as δr, and an axial clearance gap between the pocket face of the pocket and the rolling face of the rolling element is taken as δa, in the case where the grease including a base oil of a pour point of −30° C. or lower is used, at lease one of the pockets of the retainer is shaped so that the radial clearance gap ratio δr/Da is 0≦r/Da≦0.09, and the axial clearance gap ratio δa/Da is 0≦δa/Da≦0.06.

16. The fan motor using a rolling bearing according to claim 15, wherein the pockets of the retainer, each of which is shaped so that the radial clearance gap ratio δr/Da is 0≦δr/Da≦0.09, and the axial clearance gap ratio δa/Da is 0≦δa/Da≦0.06, are disposed at substantially equal spaces in at least three places.

17. A rolling bearing, which is lubricated with a grease, comprising:
an outer ring having a rolling raceway track on its inner peripheral surface;
an inner ring having a rolling raceway track on its outer peripheral surface;
a plurality of rolling elements disposed between the respective raceway tracks of the outer ring and the inner ring; and
a retainer having a plurality of pockets for locking the rolling elements to freely roll and formed of resin material,
wherein when a diameter of the rolling element is taken as Da, a radial clearance gap between a pocket face of the pocket and a rolling face of the rolling element is taken as δr, and an axial clearance gap between the pocket face of the pocket and the rolling face of the rolling element is taken as δa, in the case where the grease containing 20 mass % or less thickener is used, at least one of the pockets of the retainer is shaped so that the radial clearance gap ratio δr/Da is 0≦δr/Da≦0.09, and the axial clearance gap ratio δa/Da is 0≦δa/Da≦0.06.

18. The rolling bearing according to claim 17, wherein the pockets of the retainer, each of which is shaped so that the radial clearance gap ratio δr/Da is 0≦δr/Da≦0.09, and the axial clearance gap ratio δa/Da is 0≦δa/Da≦0.06, are disposed at substantially equal spaces in at least three places.

19. A fan motor using a rolling bearing lubricated with a grease, the rolling bearing comprising: an outer ring having a rolling raceway track on its inner peripheral surface; an inner ring having a rolling raceway track on its outer peripheral surface; a plurality of rolling elements disposed between the respective raceway tracks of the outer ring and the inner ring; and a retainer having a plurality of pockets for locking the rolling elements to freely roll and formed of resin material, wherein, when a diameter of the rolling element is taken as Da, a radial clearance gap between a pocket face of the pocket and a rolling face of the rolling element is taken as δr, and an axial clearance gap between the pocket face of the pocket and the rolling face of the rolling element is taken as δa, in the case where the grease containing 20 mass % or less thickener is used, at least one of the pockets of the retainer is shaped so that the radial clearance gap ratio δr/Da is 0≦δr/Da≦0.09, and the axial clearance gap ratio δa/Da is 0≦δa/Da≦0.06.

20. The fan motor using a rolling bearing according to claim 19, wherein the pockets of the retainer, each of which is shaped so that the radial clearance gap ratio δr/Da is 0≦δr/Da≦0.09, and the axial clearance gap ratio δa/Da is 0≦δa/Da≦0.06, are disposed at substantially equal spaces in at least three places.

* * * * *